No. 650,838. Patented June 5, 1900.
H. E. HEATH.
STEERING MECHANISM FOR AUTOMOBILES.
(Application filed Jan. 2, 1900.)

(No Model.) 3 Sheets—Sheet 1.

Witnesses: Inventor:
F. G. Holcombe. Harry E. Heath, by
C. E. Buckland. Harry P. Williams
atty.

No. 650,838. Patented June 5, 1900.
H. E. HEATH.
STEERING MECHANISM FOR AUTOMOBILES.
(Application filed Jan. 2, 1900.)
(No Model.) 3 Sheets—Sheet 2.

No. 650,838. Patented June 5, 1900.
H. E. HEATH.
STEERING MECHANISM FOR AUTOMOBILES.
(Application filed Jan. 2, 1900.)

(No Model.) 3 Sheets—Sheet 3.

Witnesses: Inventor:

UNITED STATES PATENT OFFICE.

HARRY E. HEATH, OF WINDSOR, CONNECTICUT, ASSIGNOR TO THE EDDY ELECTRIC MANUFACTURING COMPANY, OF SAME PLACE.

STEERING MECHANISM FOR AUTOMOBILES.

SPECIFICATION forming part of Letters Patent No. 650,838, dated June 5, 1900.

Application filed January 2, 1900. Serial No. 44. (No model.)

*To all whom it may concern:*

Be it known that I, HARRY E. HEATH, a citizen of the United States, residing at Windsor, in the county of Hartford and State of Connecticut, have invented certain new and useful Improvements in Steering Mechanism for Automobiles, of which the following is a specification.

This invention relates to an automobile steering mechanism which is so arranged that when the steering-handle is moved the steering-axle is oscillated on a center that is nearer to the wheel on the inside than to the wheel on the outside of the turn to be made.
The object of the invention is to provide a durable, sensitive, and easily-controlled mechanism of this nature in which the steering-axle when oscillated automatically tends to straighten and become locked, so that the vehicle will run straight forward.

In the form of the invention illustrated in the accompanying drawings the steering-axle is connected at two points with a bar fixed with relation to the vehicle-body, and when the steering-handle is moved in either direction a lever and link unlock and close a toggle which has an end fastened to the fixed bar and an end fastened to a bow secured to the axle, causing the toggle to force forward the end of the axle and the wheel on the outside of the turn. When the handle is returned or allowed to return to its normal position, the toggle opens and the end of the axle and wheel on the outside of the turn draw back until the toggle becomes locked with the axle straight.

Figure 1:
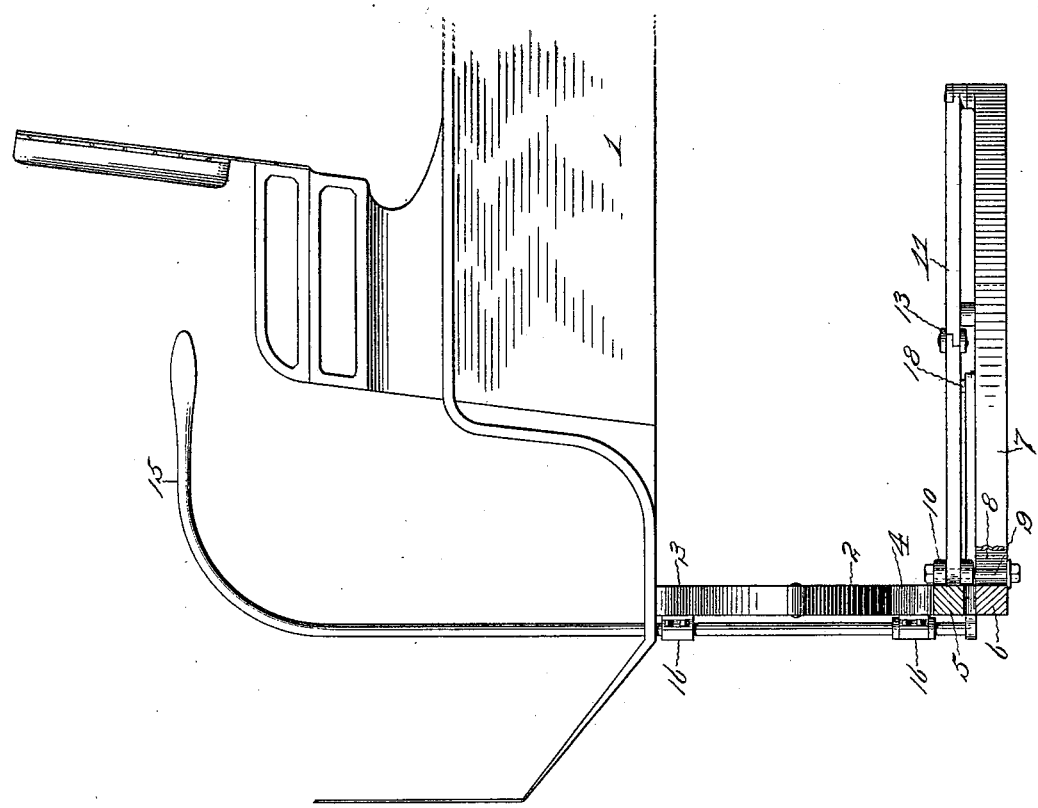
Figure 2:
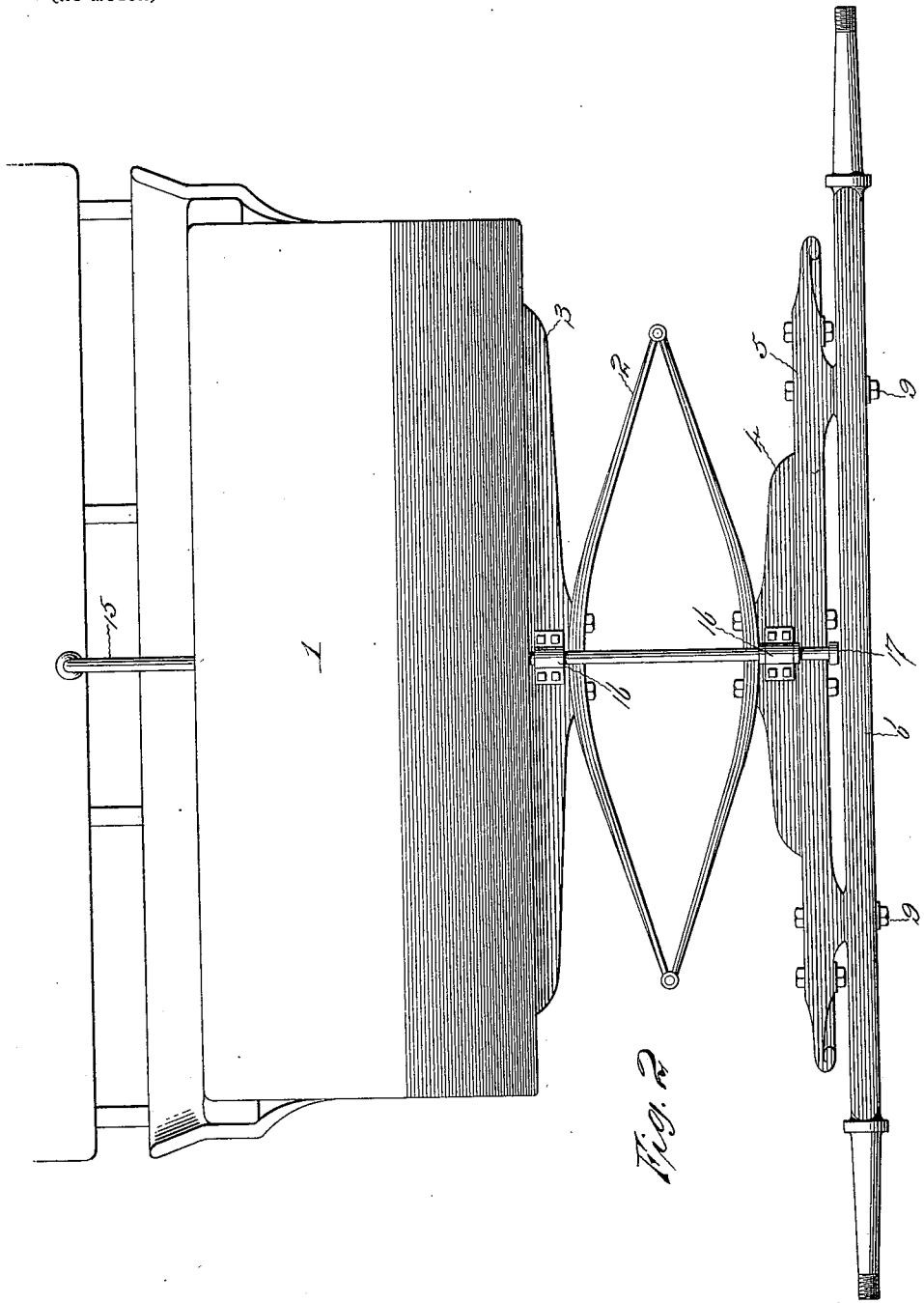
Figure 3:
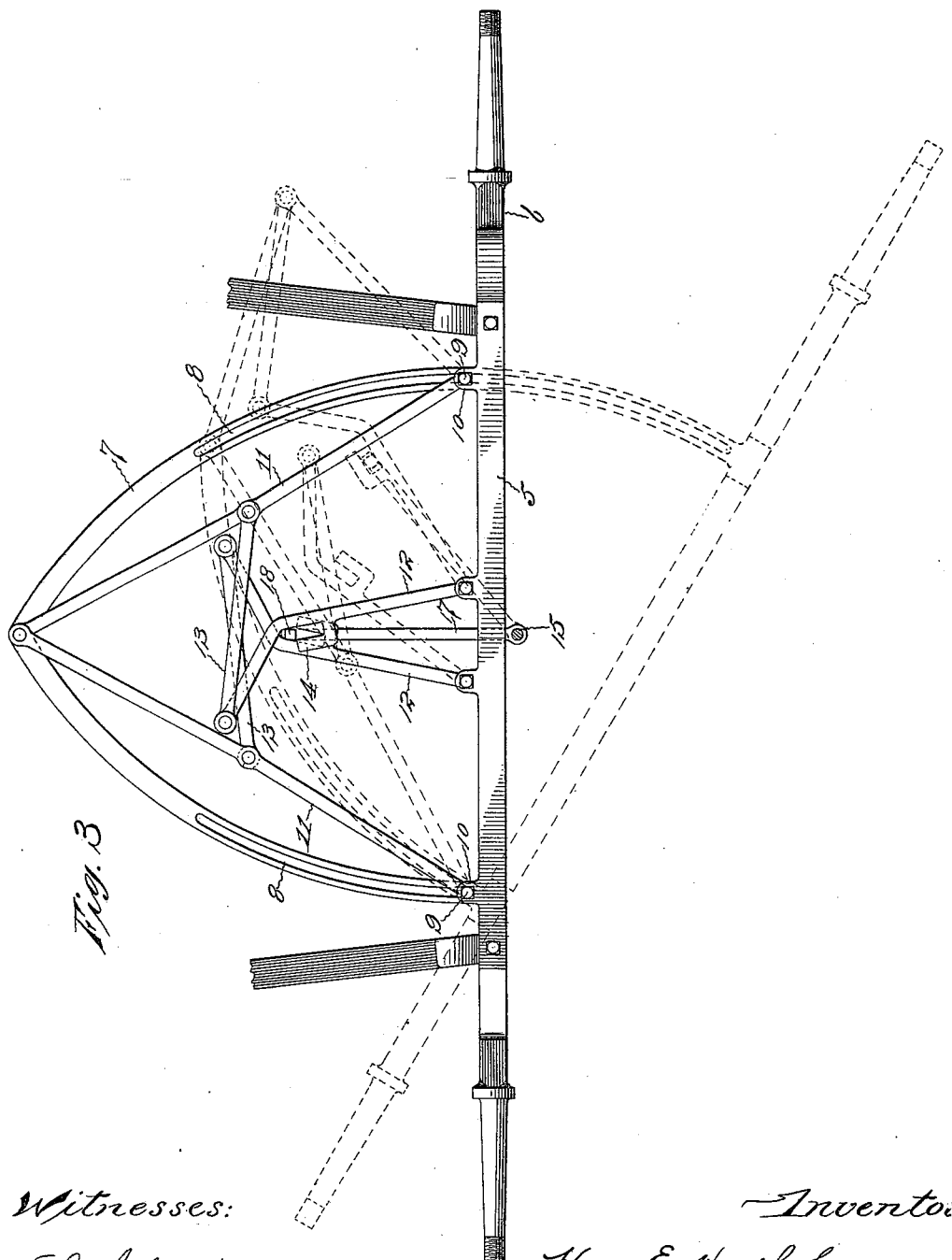

Of the views, Figure 1 shows a side elevation of the forward part of an automobile-body provided with the improved steering mechanism. Fig. 2 shows a front elevation of the vehicle and steering mechanism, and Fig. 3 shows a plan of the steering-axle and mechanism for moving it.

The body 1 of the vehicle, which may be of any suitable design and propelled by any kind of motor, can be hung upon any desired style of springs. The front end of the body shown is supported by an elliptical spring 2, the top of which is fastened to a block 3, secured to the under side of the body, while the bottom is fastened to a block 4, secured to the bar 5.

The axle 6 has a rearwardly-extending bow 7, that is provided with vertical slots 8. One side of the bow and the slot in that side are formed on the arcs of circles, the centers of which are the axis of the bolt 9 on the opposite side, and the other side of the bow and its slot are formed on the arcs of circles, the centers of which are the axis of the opposite bolt 9. The bolts 9 pass through ears 10, projecting from the bar 5, and through the slots 8 in such manner as to loosely connect the bar and axle.

The front end of the forward arm of a toggle 11 is connected with the bar 5 by each bolt 9, and the back end of the rear arm of each toggle 11 is fastened to the bow 7. Two levers 12 are pivotally connected with the bar 5. The rear end of one lever is connected by a link 13 with the joint of one toggle, and the rear end of the other lever is connected by a similar link 13 with the joint of the other toggle. Each of these levers has an offset lug 14.

The steering-handle 15 is shown as held by bearings 16, secured to the blocks 3 and 4. Extending rearwardly from the lower end of the steering-handle between the axle and the bar is an arm 17. The rear end of this arm has a finger 18, that projects upwardly between the levers 12. When the handle is turned in one direction, the arm and finger force one lever sidewise and fold the toggle that is connected with that lever, the other toggle remaining straight. As the front ends of the toggles are held relatively fixed with relation to the vehicle-body by the bar 5, the folding of one toggle causes the bow to oscillate on the axis of the bolt 9 on the opposite side and the axle to turn on that bolt as a pivot. The axis of the lever moved being on one side and to the rear of the axis of the arm, the finger draws into the opening between the lever and its lug 14, so that when the arm is moved back to its straight position the finger 18 will engage the lug 14 and draw the lever back until the toggle is straightened. The centers are so arranged that when the arm has reached its middle position the finger 18 will have moved from back of the lug 14 and when moved farther will push against the opposite lever and leave the lever which it has straightened. The toggles are designed to be drawn past their centers when opened, so that they will lock fully opened. When the handle is moved in one direction, the arm and finger cause one lever and link to fold a toggle, which oscillates the bow and turns the axle on the bolt near one wheel. Moving the handle in the opposite direction through the other lever and link folds the other toggle and oscillates the bow in the other direction, so that the axle turns upon the bolt near the other wheel. The bolts which form the pivots at all times loosely hold together the bar 5, that is fixed relatively to the vehicle-body, and the axle, that is held fixed when both toggles are locked, but which is turned in one direction on one bolt when one of the toggles is folded and turned in the opposite direction on the other bolt when the other toggle is folded.

With the steering-handle straight both of the toggles are locked, and the steering-axle cannot turn until a toggle is unlocked. Both toggles cannot be unlocked at the same time. As it is necessary in making a turn to move one end of the axle forwardly against the resistance incident to the forward movement of the vehicle, there is no strain tending to unlock the toggles. After a turn has been made the resistance due to the forward movement of the vehicle causes the end of the axle that has been forced forwardly for turning to move back to its straight position, so that should the handle become free from the grasp of the driver the wheels will automatically straighten themselves and the vehicle move straight ahead. It is unnecessary when the vehicle is running straight ahead to hold the steering-handle, for the axle is locked by the toggles, and the resistance tends to hold the axle in that position rather than draw it out of that position. Not only is the steering mechanism so arranged that the steering-axle tends to straighten itself and remain straight, but it is easy to cause the vehicle to turn, for the pivot upon which the axle swings is near the wheel on the inside of the turn to be made.

If desired, the bow could be attached to the fixed bar, and the toggle connected with the bow could be attached to the axle, and then the folding of the toggles would draw back the axle instead of pushing it forward. If the connections were made in this manner, when a toggle is unlocked the tendency would be for the vehicle to make a turn, for the axle would move in the same direction as the resistance to the forward movement of the vehicle instead of opposite to the resistance offered by the forward movement of the vehicle, as when the connection is made in the first-described manner.

I claim as my invention—

1. In combination with a vehicle-body, a bar fixed with relation to the body, an axle, pivots loosely connecting the axle with the bar at two points, locking mechanism connecting the bar and axle, and a steering-handle for operating the locking mechanism and through it moving the axle with relation to the bar, substantially as specified.

2. In combination with a vehicle-body, an axle movable with relation to the body and loosely connected at two points with a part fixed relatively to the body, connecting mechanisms between the fixed part and the axle, and a steering-handle adapted to engage and move the connecting mechanism, whereby turning the handle in one direction causes the axle to swing about one of the points and turning the handle in the opposite direction causes the handle to swing about the other of the points of connection between the axle and fixed part, substantially as specified.

3. In combination with a vehicle-body, an axle movable with relation to the body and loosely connected at two points with a part fixed relatively to the body, toggles connected with the axle and the fixed part, a steering-handle, and connections between the handle and the toggles, substantially as specified.

4. In combination with a vehicle-body, an axle movable with relation to the body and loosely connected at two points with a part fixed relatively to the body, toggles connected with the axle and the fixed part, levers connected with the toggles, and a steering-handle for moving the levers, substantially as specified.

5. In combination with a vehicle-body, an axle movable with relation to the body and loosely connected at two points with a part fixed relatively to the body, toggles connected with the axle and the fixed part, levers connected with the fixed part, links connecting the levers with the toggles, and a steering-handle for moving the levers, substantially as specified.

6. In combination with a vehicle-body, an axle movable with relation to the body and loosely connected at two points with a part fixed relatively to the body, toggles connected with the axle and the fixed part, levers connected with the fixed part, links connecting the levers with the toggles, a steering-handle, and an arm projecting from the steering-handle into position to move the levers, substantially as specified.

7. In combination with a vehicle-body, an axle movable with relation to the body and loosely connected at two points with a part fixed relatively to the body, toggles connected with the axle and the fixed part, levers connected with the fixed part, lugs projecting from the levers, links connecting the levers with the toggles, a steering-handle, an arm projecting from the steering-handle, and a finger projecting from the arm between the levers adjacent to the lugs, substantially as specified.

8. In combination with a vehicle-body, an axle movable with relation to the body and loosely connected at two points with a part fixed relatively to the body, a bow extending from the axle, bolts loosely connecting the bar and the bow at two points, toggles connecting the bar and the bow, levers pivoted to the bar, lugs projecting from the levers, links connecting the levers with the toggles, an arm movably supported with its axis eccentric from the axes of the levers, a finger projecting from the arm between the levers adjacent to the lugs, and a steering-handle for moving the arm, substantially as specified.

9. In combination with a vehicle-body, a bar fixed with relation to the body, an axle, a bow extending from the axle, bolts loosely connecting the bar and the axle-bow at two points, toggles connecting the bar and the bow, levers pivoted to the bar, links connecting the levers with the toggles, a steering-handle, and a connection between the steering-handle and the levers, substantially as specified.

HARRY E. HEATH.

Witnesses:
HARRY R. WILLIAMS,
F. G. HOLCOMBE.